United States Patent [19]

Molo

[11] 4,412,325
[45] Oct. 25, 1983

[54] EQUIPMENT FOR SINGLE BAND MULTIPLEXING THROUGH DIGITAL PROCESSING

[75] Inventor: Francesco Molo, Milan, Italy

[73] Assignee: Telettra- Telefonia Elettronica e Radio S.p.A., Milan, Italy

[21] Appl. No.: 282,644

[22] Filed: Jul. 13, 1981

[51] Int. Cl.³ .............................................. H04J 4/00
[52] U.S. Cl. ....................................... 370/70; 370/50; 370/23
[58] Field of Search ....................... 370/70, 50, 69, 77, 370/19, 20, 23, 71, 76

[56] References Cited

U.S. PATENT DOCUMENTS

| | | | |
|---|---|---|---|
| 4,013,842 | 3/1977 | Kao et al. | 370/70 |
| 4,131,764 | 12/1978 | Claasen et al. | 370/70 |
| 4,131,766 | 12/1978 | Narasimha | 370/70 |
| 4,199,660 | 4/1980 | Dill et al. | 370/50 |
| 4,241,443 | 12/1980 | Sakaki et al. | 370/70 |
| 4,300,229 | 11/1981 | Hirosaki | 370/70 |
| 4,316,282 | 2/1982 | Macina | 370/50 |

OTHER PUBLICATIONS

"An Improved Method for Digital SSB-FDM Modulation and Demodulation", Maruta et al., IEEE Trans. on Comm., vol. COM-26, No. 5, May 1978, pp. 720–725.

Primary Examiner—Gerald L. Brigance
Attorney, Agent, or Firm—Holman & Stern

[57] ABSTRACT

The equipment disclosed in the present invention provides means for SSB multiplexing and demultiplexing base-band signals, equal in number to a power of two, digital signal processing techniques. The frequency modulation process of the base-band signals is partly performed with a discrete Fourier Transform (D.F.T.), the dimension of which is appreciably reduced with respect to the number of signals to be multiplexed, and partly with modulators (multipliers), some of which are of simple construction and which are fewer in number than the number of signals to be multiplexed. Filtering is effected with a set of filters with different frequency repetition periods and which, when cascade connected, from a pass-band filter equal to the frequency band which characterizes every base-band signal. The frequency repetition period of the entire filter is equal to the sampling frequency of the multiplexed signal.

6 Claims, 13 Drawing Figures

EQUIPMENT FOR SINGLE BAND MULTIPLEXING THROUGH DIGITAL PROCESSING

BACKGROUND OF THE INVENTION

The present invention concerns a system which allows, through digital processing, the SSB multiplexing and demultiplexing of a given number of base-band signals characterized by a frequency spectrum ranging from 0 to 4 kHz. Said base-band signals can be available as analog signals which, via a pre-processing network, are sampled at 8 kHz frequency and processed numerically; alternatively, the signals can be already coded in numerical form and time multiplexed on one or more transmission paths, i.e., 24 or 30 per path, more generally known as a 24 or 30 channel PCM stream. After an eventual preprocessing, the above mentioned base-band signals can be SSB multiplexed by digital processing. The latter operation supplies a signal which, by means of a digital to analog conversion and by means of subsequent modulations and filterings, can be allocated in the frequency range most suitable for transmission on frequency division systems (FDM systems).

DESCRIPTION OF THE PRIOR ART

Systems which perform the above mentioned digital SSB modulation are already known; for example, refer to the IEEE magazine "Transaction on Communications" of May, 1978 and to U.S. Pat. Nos. 4,131,766 and 4,013,842. Among the already known methods the most common is that one whereby N signals are frequency multiplexed with a discrete Fourier Transform (DFT), the dimension of which is at least equal to N and which corresponds to a modulation. The signals leaving the processor which executes the discrete Fourier transform (DFT) are filtered through N filters which can be implemented as a single variable coefficient filter. The above mentioned filters are derived from a single filter with the frequency repetition period of its filtering function equal to the sampling frequency of the frequency multiplexed signal.

SUMMARY OF THE INVENTION

The present embodiment also utilizes a single basic filter; however, said filter is split into a cascade connection of various filters that can generally be advantageously implemented with simple multiplying coefficients. The number of different types of filters is reduced with respect to the number of signals to be frequency multiplexed. The frequency modulation process is partly carried out with a reduced number of modulators (multipliers) with respect to the number of signals to be multiplexed, and said modulators are for the most part of simple implementation, and partly via a discrete Fourier transform processor, the dimension of which is reduced with respect to the number of signals to be multiplexed and which operates in an identical manner on groups of signals to be multiplexed, each group containing a number of signals equal to the number of signals to be multiplexed divided by a power of two. Filters with different frequency repetition period of their filtering function are used, together with modulators, to build a tree structure of filters and modulators. Such a tree structure has many inputs and only one output and is repeated twice to process the real and respectively imaginary samples of the signals. The tree structure of the filters and modulators is modified so as to efficiently exploit the filters arranged on the side of the structure having more input ports. One of the utmost advantages of the present embodiment, as compared with the already known methods, is comprised of the fact that the design of the digital filters is highly flexible so that it is possible to have simple multiplying coefficients in the filters themselves. Moreover, both the modulations and the Discrete Fourier Transform necessary for the system are simplified, thereby facilitating their implementation. A description of the system is included herein and subsequently the basic theories are introduced on the basis of which the system is implemented.

A system used to frequency multiplex a given number of baseband signals must also be capable of carrying out the reverse function which, with the direct functional mode of operation known, can be derived according to the general reversibility principle, where applicable. This principle is applied to the embodiment disclosed herein, therefore a detailed explanation will be given of that part of the equipment which, starting from the 0–4 kHz base-band signals, SSB multiplexes the above mentioned signals. The demultiplexing procedure of the equipment will also be explained.

DESCRIPTION OF THE PREFERRED EMBODIMENTS

Figure 1:
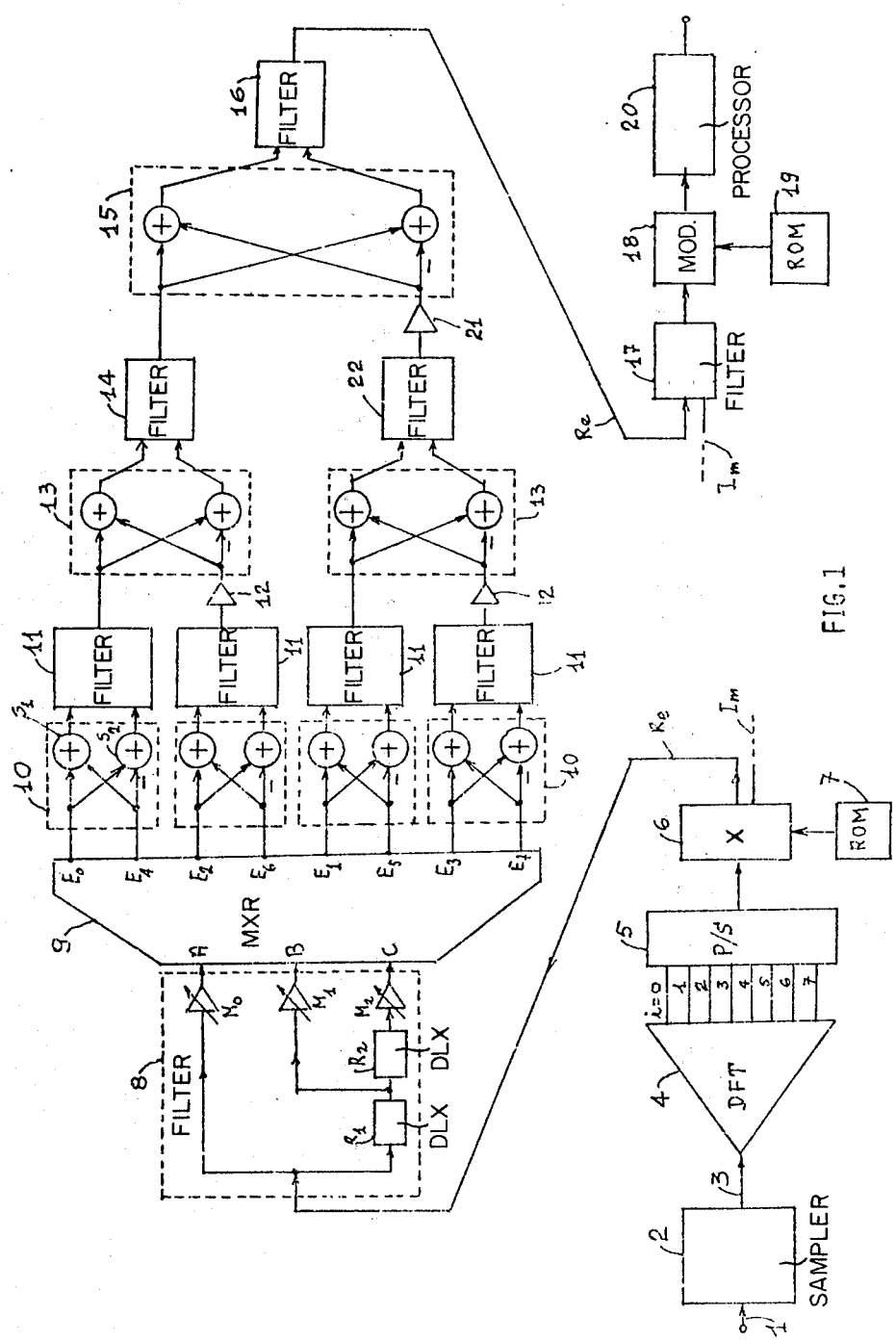
FIG. 1 depicts the multiplexing side of the system along a preferred implementation form.

FIG. 1 illustrates that part of the system which performs the frequency multiplexing, starting from the base-band signals. The equipment of this embodiment can be implemented with a number of base-band signals which are equal to a power of two, for example: 16, 32, 64 are the most frequently recurring numbers though, as usual in this type of equipment, the number of signals really used is lower i.e. 12, 24, 60 respectively.

The 64 signal system is described herein for reasons of clearness and by way of example. Sixty, out of the 64 signals, are actually utilized and they correspond either to two PCM streams entering the transmission side, each having 30 channels, or to 60 analog voice channels to be allocated in the 312–552 kHz band according to the FDM systems procedure. Sixty-four of said signals appear on input 1 of FIG. 1, either on two paths if it concerns two PCM signal streams already sampled, coded and time multiplexed, or on 64 paths (60 effective) should it concern 0–4 kHz band allocated analog signals.

Figure 2:
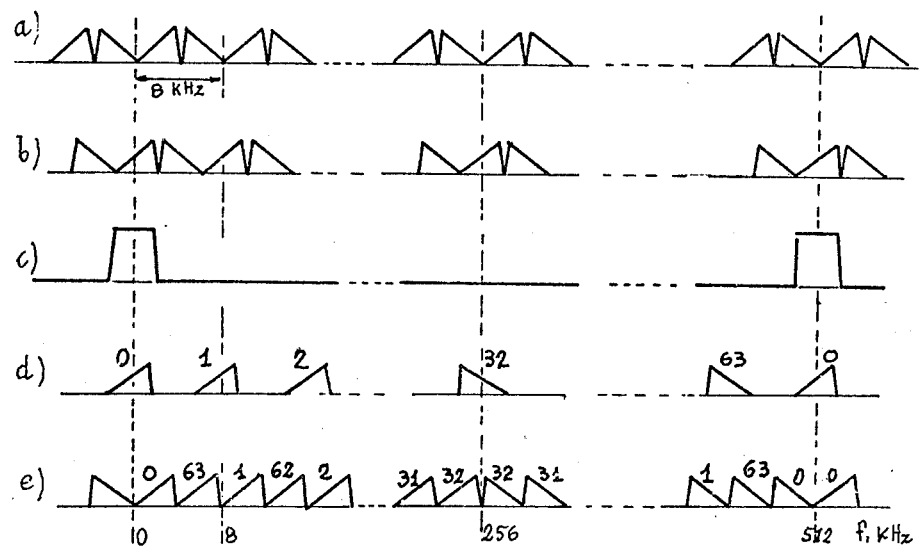
FIG. 2 is a schematic amplitude versus frequency plot of: the frequency spectrum of a base-band signal to be multiplexed (a); the same type of spectrum as in (a) but shifted by 2 kHz towards lower frequencies (c); the frequency shape of the equivalent filter that is used, together with its frequency shifted version, to separate a 4 kHz band in a 512 kHz wide frequency range for every base-band signal (d); the spectrum of the complex multiplexed signal; and (e) the spectrum of the real multiplexed signal.

Each incoming path will, if analog, be sampled at 8 kHz in block 2 of FIG. 1 hence with a spectrum which, as per the PCM signals, will be frequency recurrent as indicated in FIG. 2(a) in compliance with the usual representation procedure.

Furthermore block 2 transforms the signals according to already known procedures in order to suit them to the next processing step; at the output they will appear as linear coded digital signals, the spectrum of which recurs with an 8 kHz period but shifted by 2 kHz towards the low frequencies (FIG. 2b).

By this operation it is to be understood that the samples of each signal are alternatively to be regarded as real and imaginary. Each path can now be characterized by the individual spectrum within the −2 kHz and +2 kHz limits around a frequency multiple of 4 kHz. The equipment makes, through digital filtering, a selection of one of the above mentioned bands for every channel, at a frequency multiple of 8 kHz, that is different for each channel—see FIG. 2d). The signals numbered from 32 to 63 have an inverted spectrum with respect to the position at equal frequency in the periodic recurrence of the base-band signal spectrum as it can be deduced from the comparison with signal 32 operating at 256 kHz of FIG. 2b with respect to the position at a similar frequency of a generic signal shown in FIG. 2b).

Signals 32 to 63 necessitate a spectrum reversal which is obtained by modulating with a 4 kHz the base-band signal and this is achieved by changing the sign of one out of two samples.

The signals leave output 3 of block 2 as per the herein above configuration, preferably as time multiplexed signals. By $c_k$ it is meant (k variable from 0 to 63) a generic set of 64 adjacent samples of the above mentioned time multiplexed signal; a particular value of index k assigns the sample characterized by it to the signal which will occupy a corresponding position (see FIG. 2d) in the frequency multiplexed signal.

Values $c_k$ are on the whole arranged in sets of eight adjacent samples each, and are arranged in each set so as to subsequently correspond to signals of spectral position 64 kHz apart; the first sample of each set corresponds to signals having an 0,4,2,6,1,5,3,7 spectral position. According to the present invention, the discrete Fourier transform (DFT) is performed in block 4 on each of the sets of eight adjacent samples in $c_k$, being the DFT of dimension eight, i.e., the powers of the complex number exp $(j2\pi/8) = (1+j)/\sqrt{2}$ are used in it as multiplying coefficients. In this phase the incoming samples can be always regarded as real. Sequences of eight samples are available at the output of block 4; some of the cited samples are real and other complex, but from this point onwards they can be all regarded as complex and the next block 5 will arrange the outgoing samples in a serial form if not already so arranged at the output of block 4 which operates the DFT. Hence, the samples will appear at the input of block 6 in a time serial form. A generic set of 64 adjacent complex samples, which are in correspondence with the previous $c_k$ samples and can be denoted with $d_{k_o,i}$ where "$k_o$", and "i" assume a value from 0 to 7, and "$k_o$" *characterizes the set of eight adjacent samples on which DFT has been performed and "i" characterizes the eight transformed samples in each set, arranged as per the rule usually applied when writing the expression relative to an eight data DFT.*

Block 6 contains a multiplier which multiplies the incoming samples by exp $(jk_o i 2\pi/64)$; indices "$k_o$" and "i" have been defined above. The multiplying constants used by multiplier 6 are supplied by block 7 usually comprised of a read only memory (ROM).

The complex samples leaving multiplier 6 are split into real (Re) and imaginary parts (Im) and these are separately forwarded into two identical sets of filters and modulators. Only one of these sets is, for reasons of simplicity, depicted in FIG. 1, and it includes blocks 8 through 17 and is regarded as that which operates on the real part of the signals.

Upon separating the real part from the imaginary one at the output of multiplier 6, it must be borne in mind that the samples, entering block 4 and related to the single, base-band signal are alternatively real and imaginary; hence it will be necessary to exchange, at the output of multiplier 6, the real and imaginary parts in every one out of the two blocks of 64 complex samples and alternating the sign of the imaginary part leaving multiplier 6.

By $s_{k_o,i}$ it is meant the real part of the samples leaving multiplier 6 and in a one to one relation with samples $d_{k_o,i}$, and entering the cascade of filters and modulators belonging to the real section, where "$k_o$" and "i" have the same meaning of the aforementioned designations. The $s_{k_o,i}$ time samples are simultaneously forwarded on two paths; on the first they find the multiplier $M_o$, and on the other the delay elements $R_1$ and $R_2$ and each one of them time shifts the samples by 8 times the distance between two consecutive $s_{k_o,i}$ samples. In this case shift $\tau$ corresponds to the period of the frequency 512 kHz with which the serially arranged samples are routed throughout the equipment. At the output of delay $R_1$ the samples are sent to multiplier $M_1$ and at the same time to delay $R_2$ at the output of which they find the multiplier $M_2$.

The eight outputs of multiplexer 9 are sent in pairs to four identical devices 10 which take the sum and difference of the incoming signals. Specifically, adder $S_1$ sums the signal leaving $E_0$ to the one leaving $E_4$, and similarly for the other outputs, while adder $S_2$ subtracts the signal leaving $E_4$ from the one leaving $E_0$, and similarly for the other three pairs of signals. The four pairs of new signals are sent to each one of the four identical non recursive filters implemented along the first canonical form. Said filters have a frequency period of 64 kHz but operate at a 512 KHz rate, and each one should be expressed as $$H(z^8) = \sum_{r=0}^{R} h_r z^{-8r} \text{ where } z = \exp(j2\pi w/w_o),$$

where w is the frequency and $w_o$ corresponds to 512 kHz. Then the sum signal leaving blocks 10 is, for example, forwarded to the $h_r$ multiplier coefficients with even order r, and the difference signal to the $h_r$ multiplier coefficients with odd order r. As seen in FIG. 1, two of the filters 11 are connected to a modulator 12, the multiplying coefficient of which cyclically assumes values $1, j, -1, -j$. These coefficients change value at a 64 kHz rate and, therefore, the signal samples which transit in those modulators are multiplied in sets of eight adjacent samples with the same value. Since the multiplying coefficients of said modulators also assume imaginary values, the output signal must also be forwarded to the block of filters and modulators which processes the imaginary samples. Similarly, the corresponding multiplier on the block which processes the signal's imaginary samples, when the multiplying coefficients assume an imaginary value, must also send its output signal to the block which processes the real samples.

The two following blocks 13 operate on the pair of incoming signals with the same modality of blocks 10, and similarly for the identical filters 14 and 22 which operate in the same manner as filters 11, the only difference being that the filters contained in blocks 14 and 22 have a frequency repetition period of their filtering function equal to 32 Khz.

The output of filtering block 22 is connected to modulator 21, the multiplying coefficient of which assumes the consecutive powers of the number $(1+j)/\sqrt{2}$ and, as per modulators 12, it maintains a constant multiplying coefficient for eight consecutive signal samples and it varies its coefficient values at a rate of 64 Khz. Block 15 operates like blocks 10 and 13 and its two output signals enter filter 16 which is eventually of the non-recursive type, and has a frequency repetition period of its filtering function equal to 16 Khz. The output port of filter 16 is connected to filter 17 implemented in a recursive form owing to its steep transition between pass-band and stop-band. The frequency repetition period of said filter is equal to 8 Khz. As already stated, the cascade of elements from block 8 to block 17 is duplicated to permit the real and imaginary parts of the signals to be processed.

The real (Re) and imaginary (Im) signals leaving filter 17, relative to the real part, and the related filter relative to the imaginary one, both enter modulator 18 as a complex signal. Said complex signal has a periodic spectrum with a 512 kHz period as indicated in FIG. 2d) for frequencies within 0 and 512 kHz. Modulator 18 causes a 2 kHz frequency shift towards the higher frequencies, which is obtained by multiplying the adjacent samples of the complex signals by the consecutive powers of the $\exp(j2\pi/4 N)$ number, being said consecutive powers supplied by the ROM memory 19 to multiplier 18. Only the real section of the signal is kept at the output of said multiplier 18, the spectrum of which assumes a configuration which is symmetric with respect to the 256 Khz frequency. Said signal is the final frequency multiplexed signal in a sampled form.

Block 20, the operating procedures of which are already known, processes said signal in an analog form so that the 8 Khz to 248 Khz signal spectrum, corresponding to a 60 channel multiplexed signal, is translated, after digital to analog conversion, filtering and modulation, into the 312 kHz–552 kHz band.

Even if the principles stated herein are not binding, a theoretic description is given of the embodiment in compliance with the designations adopted by the literature available on this subject. FIG. 2(c) schematically illustrates the amplitude response versus frequency of a digital filter H(z), where $z = \exp(j2\pi w/w_o)$ and $w_o$ is the sampling rate of the frequency multiplexed digital signal, the aforestated filter having a pass-band within $-2$ Khz and $+2$ Khz around the frequencies that are multiples of $w_o$, that correspond to 512 Khz in case of 64 channels, and said filter properly attenuates all other frequencies. Filter H(z) is preferably designed as a recursive filter, and if numerator and denominator are of identical degree, equal to I, it can be expressed as:

$$H(z) = \prod_{i=1}^{I} \frac{z^{-1} - a_i}{z^{-1} - b_i} = \prod_{i=1}^{I} K \frac{1 - z^{-1}/a_i}{1 - z^{-1}/b_i}$$

Each denominator factor of the previous expression has a $1-x$ form, and since N is equal to a power of 2, i.e., $N = 2^L$, the following relation is valid $$\frac{1}{1-x} = \frac{(1+x)(1+x^2)(1+x^4) \ldots (1+x^{N/2})}{1-x^N} \quad (1)$$

The samples $s_{k_o,i}$ which flow into the three multipliers $M_0, M_1, M_2$ are multiplied by the latter by a series of eight coefficients (some of which could be zero) which are cyclically repeated in synchronism with index "i" appearing as pedix to samples $s_{k_o,i}$, being each multiplier supplied with a different set of coefficients. Multiplier $M_2$ assumes opposite signs for sequences having $k_o = 0, 1, 2, 3$ and $k_o = 4, 5, 6, 7$. The three sample sequences leaving filter 8 enter multiplexer 9 that connects inputs A,B,C to outputs $E_r$ with an 0 to 7 variable "r" index, in such a way that the 8 adjacent samples $s_{k_o,i}$ (now modified by multipliers $M_0, M_1, M_2$) are connected to input $E_r$ in such a way that r is equal to index "$k_o$" in $s_{k_o,i}$; it must be taken into account that a sequence of eight adjacent samples $s_{k_o,i}$ (i=0 ... 7), marked by a given value of "$k_o$" appears in B delayed by $8\tau$ with respect to A, and in C by $16\tau$ with respect to A. If $T_o$ is a time interval equal to $8\tau$, then in eight consecutive $T_o$ time intervals, arranged so that each can contain eight $s_{k_o,i}$ samples with an 0 to 7 variable "i"s, the connection between inputs A,B,C and outputs $E_r$ is made as per the table hereunder:

TABLE 1

| $T_o$ sequence | A | B | C |
|---|---|---|---|
| 0 | $E_0$ | $E_7$ | $E_3$ |
| 1 | $E_4$ | $E_0$ | $E_7$ |
| 2 | $E_2$ | $E_4$ | $E_0$ |
| 3 | $E_6$ | $E_2$ | $E_4$ |

TABLE 1-continued

| $T_o$ sequence | A | B | C |
|---|---|---|---|
| 4 | $E_1$ | $E_6$ | $E_2$ |
| 5 | $E_5$ | $E_1$ | $E_6$ |
| 6 | $E_3$ | $E_5$ | $E_1$ |
| 7 | $E_7$ | $E_3$ | $E_5$ |

By applying the above equation (1) to each denominator factor of the H(z) expression, we can factor H(z) as follows:

$$H(z) = K_0(z)K_1(z^2)K_2(z^4) \ldots K_L(z^N) \quad (2)$$

In Equation (2) the H(z) filter is decomposed in a cascade of filters, the first of which, $K_o(z)$ has a frequency period equal to $w_o$, and the second equal to $w_o/2$ and so on, the last $K_L(z^N)$ (with $L=\log_2 N$) has a frequency repetition period equal to $w_o/N=\Omega$ which is the sampling frequency of the base band signals, in this case 8 Khz.

Figure 3:
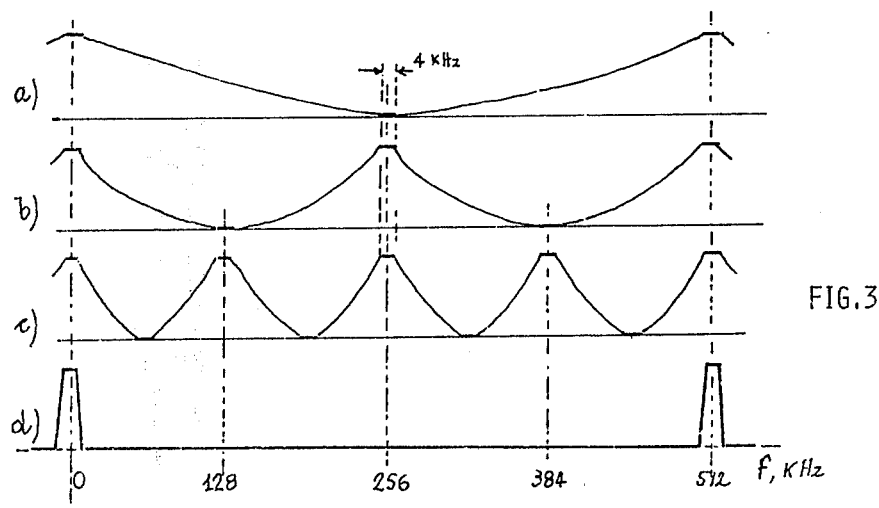
FIG. 3 is a schematic amplitude versus frequency plot of the decomposition of a filter into a cascade connection of filters with decreasing frequency repetition period of their response, some of these filters being depicted in lines (a), (b), (c).

The aforementioned filters, except for $K_L(z^N)$ are of the nonrecursive type, while $K_L(z^N)$ is purely recursive, i.e. the numerator is a constant. The decomposition (2) permits a thorough analysis of the principle on which the embodiment is based, starting from a filter H(z) the design of which is done following known procedures; however, the explanation of the $K_r(z^{2r})$ filters performance allows a lot of flexibility in filter design. This explanation is given by FIG. 3, more specifically FIG. 3(a), which schematically depicts the attenuation of filter $K_o(z)$, the function of which is to allow the frequencies allocated within a $-2$ kHz and $+2$ kHz range and around the $w_o$ multiple frequencies to transit, and to appreciably attenuate the frequencies allocated in the abovesaid range around the odd order multiples of the $w_o/2$ frequency.

Similarly $K_1(z^2)$, the transfer function of which is schematically depicted in FIG. 3(b), allows the transmission of the 4 kHz bands around even multiples of the 128 kHz frequency, while it attenuates similar frequency bands around the odd multiples of 128 kHz.

The same explanation is applicable for the other filters too, of which filter $K_2(z^4)$ is schematically represented in FIG. 3(c). Filter $K_L(z^N)$ is purely recursive, it attenuates the 4 kHz wide frequency bands centered around the 4 kHz odd order multiples and permits similar frequency bands centred around the 4 kHz even multiples to transit.

The pass-bands of the filters obtained from decomposition (2) can have large amplitude variations with respect to frequency, nonetheless their cascade connection supplies the total filter H(z) depicted at FIG. 3(d). The explanation given for filters $K_r(z^{2r})$ permits them to be designed without having to recur to the exact decomposition (2); hence each filter can be designed according to the specific attenuation requisites mentioned above. Moreover, each filter can be of the non-recursive or recursive type, including filter $K_L(z^N)$.

An advantage of this invention is that there are procedures and possibilities to design non-recursive and recursive filters in compliance with the expected attenuation requisites and the multiplying coefficients thereof can be very simple and particularly convenient to implement, especially when adopting serial arithmetic (to this concern refer to the article by D. J. Goodman—M. J. Carey on "Nine Digital Filters for Decimation and Interpolation" IEEE Transaction on Acoustic Speech and Signal Processing, April 1977 page 121, and the article by W. Wegener on "Design of Wave Digital Filters with Very Short Coefficient Word Lengths" Proceedings of International Symposium on Circuit and Systems, 1976 page 473). For reasons of clarity the case of 64 signals is taken as a reference, where $N=64=2^6$, and H(z) is obtained as a product of 7 filters from:

$$H(z) = K_0(z)K_1(z^2)K_2(z^4)K_3(z^8)K_4(z^{16})K_5(z^{32})K_6(z^{64}) \quad (3)$$

A certain number of filters of the set of seven filters on the right side of (3) and starting from the left, in this case three non-recursive filters, are decomposed according to the following expression:

$$K_0(z)K_1(z^2)K_2(z^4) = \sum_{i=0}^{7} z^{-i}H_i(z^8) \quad (4)$$

This decomposition is straightforward since the aforementioned filters are non-recursive, hence their expression is a polynomial in the variables, respectively, $z^{-1}$, $z^{-2}$, $z^{-4}$.

According to a general principle, the frequency multiplexing of N signals as per the configuration of FIG. 2(d) can be accomplished by filtering each of the base-band signals (the spectrum of which is denoted by $X_k$ ($z^N$), where index k is bound to the desired channel frequency location as per FIG. 2(d), with the H(z) filter ($\Omega=8$ kHz) $K\Omega$ shifted on the frequencies axis. The analytic expression of said frequency shifted filter, called $H_k$ (z), can be obtained from H(z) where the variable z is substituted by $z \cdot \exp(-j2\pi k/N)$; the $\exp(j2\pi/N)$ complex number shall be called $W_N$. Let us suppose that the complex signal relative to the base-band signal is called $X_k(z^N)$ and that it will have a final location around the $k\Omega$ frequency and that it has already a properly oriented spectrum; the complex signal of FIG. 2(d) can then be expressed as:

$$Y(z) = \sum_{k=0}^{N-1} X_k(z^N) H_k(z)$$

Due to expression (3) and (4) and by the fact that $W_N^N=1$, the result is that $$Y(z) = \sum_{k=0}^{N-1} \sum_{i=0}^{7} z^{-i} W_N^{ki} H_i(z^8 W_N^{8k}) K_3(z^8 W_N^{8k}) K_4(z^{16} W_N^{16k}) \cdot \quad (5)$$

$$K_5(z^{32} W_N^{32k}) K_6(z^{64}) X_k(z^{64})$$

Expression (5) of filter $K_6$ ($z^{64}$) can be moved outside the summation hence arranged, lets say, at the output of the structure which carries out the operation indicated by expression (5).

If by $\hat{Y}(z)$ is indicated the signal at the input of filter $K_6(z^{64})$ the expression (5) is also applied to it but with factor $K_6(z^{64})$ excluded. Before proceeding, index k is broken-down into two variables, that is $$k = k_0 + 8 k_1$$

thereby dividing the 64 signals into eight sets of eight signals, each set being characterized by one of the values within 0 to 7 which $k_o$ can assume, in accordance with the comment made to FIG. 1. Index $k_1$ also assumes the values from 0 to 7 and characterizes a signal available inside each of the aforesaid set of signals in an ascending order with frequency. Note that since $W_N^{64}=1$ then $$W_N^{-8kr} = W_N^{-8(k_0+8k_1)r} = W_N^{-8k_0r} \text{ moreover, in expression (5)}$$

the summation on index k can be split into two summations on the indices $k_0$ and $k_1$. The expression of $\hat{Y}(z)$ at the input of filter $K_6(z^{64})$ can be written as:

$$\hat{Y}(z) = \sum_{i=0}^{7} z^{-i} \hat{Y}_i(z^8) \quad (6)$$

with $$\hat{Y}_i(z^8) = \sum_{k_0=0}^{7} H_i(z^8 W_N^{-8k_0}) K_3(z^8 W_N^{-8k_0}) K_4(z^{16} W_N^{-16k_0}) \cdot \quad (7)$$

$$K_5(z^{32} W_N^{-32k_0}) W_N^{k_0 i} \sum_{k_1=0}^{7} W_N^{8k_1 i} X_{k_0+8k_1}(z^{64})$$

The summation with respect to index $k_1$ at the far right of expression (7) shows a DFT on the samples of the set of eight signals, such set having a constant $k_0$ index; the transform is of dimension eight wherein $W_N^{8k_1 i}$ (N=64) can be substituted by $W_8^{k_1 i}$, being $W_8$ the eight root of unity given by $W_8 = \exp(j2\pi/8)$. Hence:

$$\rho_{k_0,i}(z^{64}) = W_N^{k_0 i} \sum_{i=0}^{7} W_8^{k_1 i} X_{k_0+8k_1}(z^{64}) \quad (8)$$

Signals $\hat{Y}_i(z^8)$ have argument $z^8$ which denotes that the samples of the aforestated signals flow at a 64 kHz rate, since signals $\rho_{k_0,i}(z^{64})$ at a rate of 8 kHz also transit along filters $H_i(z^8)$ which interpolate the incoming signal on the time axis thereby supplying at the output a sample every $8\tau$ time interval (being $\tau$ the period whch corresponds to the 512 kHz frequency). By using expression (8), expression (7) of $\hat{Y}_i(z^8)$ is split into two summations, one for the even values of index $k_0$ and one for the odd values and the cited even and odd indices can be expressed as $2k_0$ and $2k_0+1$, where $k_0$ will now become 0,1,2,3. It results therefore:

$$\hat{Y}_i(z^8) = \quad (9)$$

$$\sum_{k_0=0}^{3} H_i(z^8 W_N^{-16k_0}) K_3(z^8 W_N^{-16k_0}) K_4(z^{16} W_N^{-32k_0}) K_5(z^{32}) \rho_{2k_0,i}(z^{64}) +$$

$$\sum_{k_0=0}^{3} H_i(z^8 W_N^{-8} W_N^{-16k_0}) K_3(z^8 W_N^{-8} W_N^{-16k_0}) K_4(z^{16} W_N^{-16} W_N^{-32k_0}) \cdot$$

$$K_5(z^{32} W_N^{-32}) \rho_{2k_0+1,i}(z^{64})$$

Figure 4:
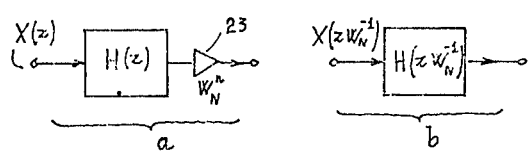
FIGS. 4(a) and 4(b) illustrate schematically how a modulator can be removed from a filter and the related input signal.
Figure 5:
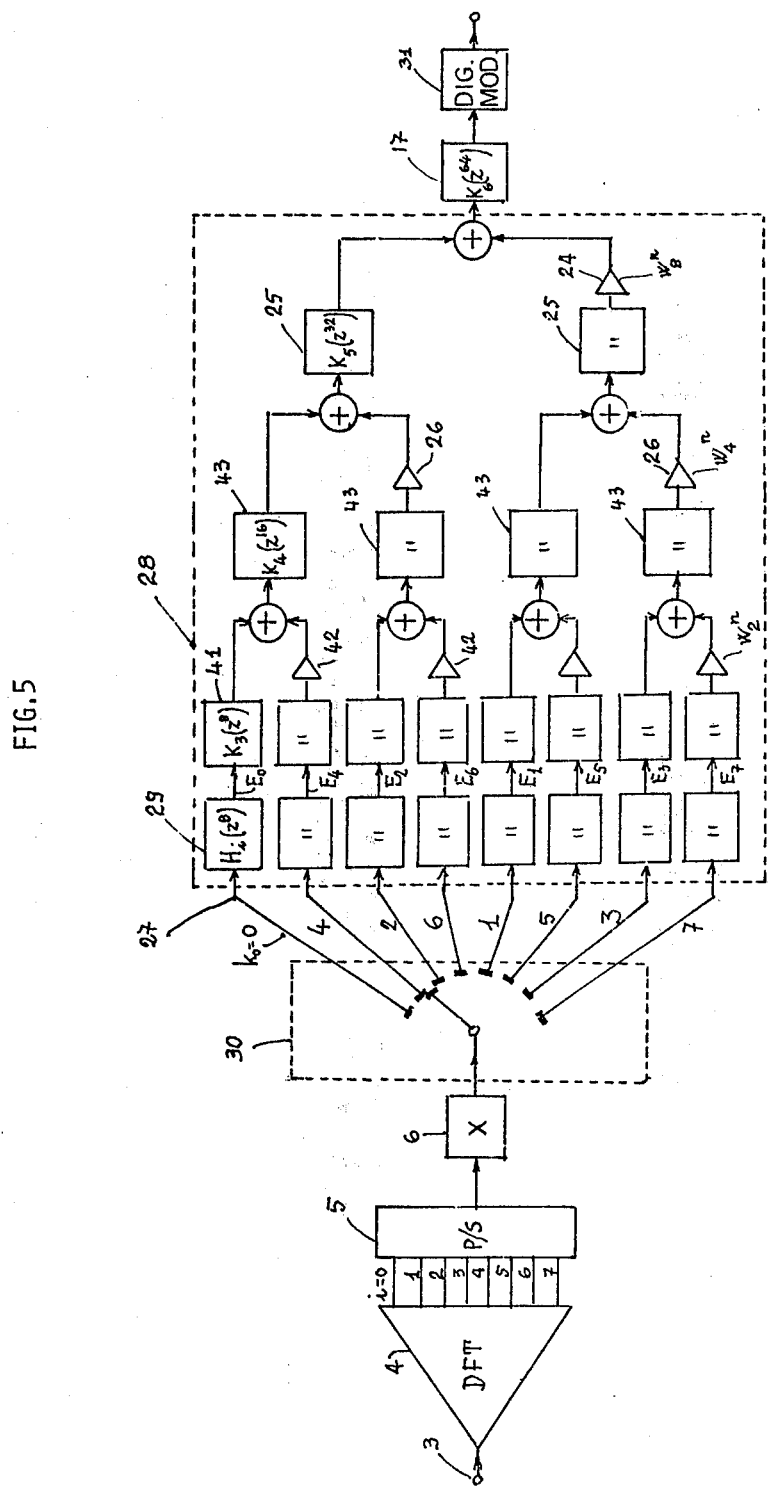
FIG. 5 depicts a modulating and filtering part of the system in its more straightforwardly derivable form.

The two summations have different filter sets which however can become identical by applying to the second summation of expression (9) the equivalence between structures "a" and "b" of FIG. 4, within which modulator 23 multiplies the subsequent signal samples at a rate of 512 kHz by the subsequent powers of $W_N$. FIG. 5 shows the details of block 28, including the structure comprised of filters and modulators to be obtained. Modulator 24 shown in FIG. 5 is similar to modulator 23 of FIG. 4 except for the signal flow which in FIG. 5 is at a rate of 64 kHz, hence modulator 24 will encounter non zero samples only at $8\tau$ intervals, and the time adjacent samples are multiplied by the powers of $W_8$. The introduction of modulator 24 of FIG. 5 permits removal of filtering block 25 on the path followed by the signals which correspond to the two summations of expression (9) and which carry out the filtering function given by $K_5(z^{32})$.

Going onwards, index $k_0$ which appears in (9) is split again in even and odd values, whilst modulator 23 of FIG. 4 multiplies the adjacent samples by the powers of $W_N^{2n}$ which for FIG. 5 with signals at a 64 kHz rate entails, for the modulators, multiplying the adjacent transiting samples by the consecutive powers of $W_4 = \exp(j2\pi/4)$.

A further subdivision on index $k_0$ completes the structure of block 28 depicted in FIG. 5 at the inputs of which arrive signals $\rho_{k_0,i}$ with constant "i" and owing to the 8 values assumed by index $k_0$ of the signals (8).

Block 28 should be repeated eight times in correspondence to the eight "i" values having to introduce at the output of each block an element which shall supply a delay of $i\tau$, hence proceeding to sum the outputs of the aforestated delays in order to obtain signal Y(z) in compliance with expression (6). Each of the aforementioned blocks must be then repeated twice for each value of index "i" in order to filter the real and the imaginary component of the signals.

The cited block can be reduced to two, one for the real part and the other for the imaginary part of signals $\rho_{k_0,i}$ if the signals are time multiplexed.

FIG. 6(a) shows the samples with a time T interval which corresponds to an 8 kHz period of any one $\rho_{k_0,i}$ signals for any fixed value of $k_0$ and i; FIG. 6(b) shows the samples leaving block 28 of FIG. 5 at a rate of 64 kHz owing to the zero value of index i; FIG. 6(c) shows the samples leaving the same structure relative to a generic value of index i different than zero and at the output of said structure is inserted an element with an $i\tau$ delay.

Should the $i\tau$ delay element be shifted at the input of every input 27 (FIG. 5), each one of said inputs shall, owing to the eight structures corresponding to the eight values of index "i", receive the samples sequentially in time with a $\tau$ delay as indicated in FIG. 6(d) for a generic value of index $k_0$.

The samples of signals $\tau_{k_0,i}$, arranged in a time sequence as per index i, can transit in only one structure, i.e., block 28 of FIG. 5 which shall now operate at a rate of 512 kHz and within which filter 29 $H_i(z^8)$ must change its multiplying coefficients at a 512 kHz rate. Obviously, since signals $\rho_{k_0,i}$ are complex two similar structures must be provided, i.e., one for the real samples of the signal and one for the imaginary samples. Signal $\hat{Y}(z)$ is now available at the output of block 28 and will transit through filter 17 which will once again be split into two identical filters, i.e., one for the real part and the other for the imaginary one.

Figure 6:
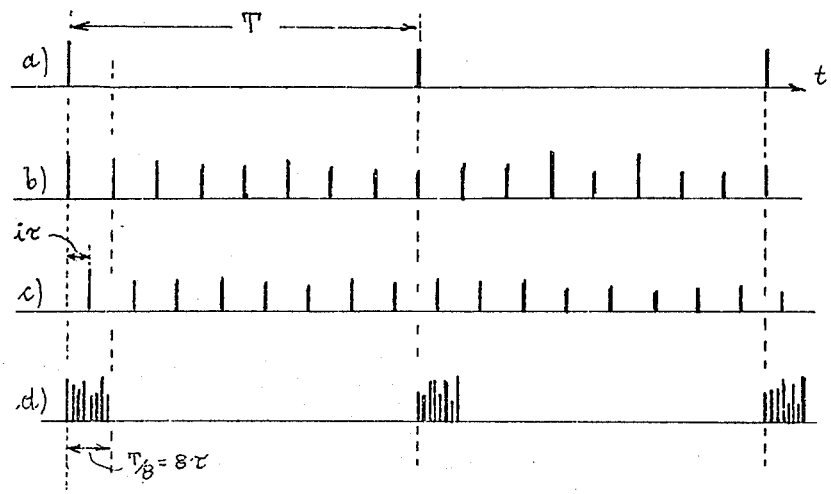
FIGS. 6(a) through 6(d) are timing diagrams which depict the time sequence of samples transiting through some points of the structure of FIG. 5 and FIG. 1.

A further simplification is obtained if the samples belonging to signals $\rho_{k_0,i}$ (for a fixed $k_0$ and i changing from 0 to 7 said samples being illustrated at FIG. 6.(d) are delayed by a multiple of $8\tau$ for a given value of index $k_0$, i.e., they enter inputs 27, of block 28 shown at FIG. 5, with the following order of $k_0$: 0,4,2,5,1,6,3,7. Specifically, in order that a sample for every signal $\rho_{k_0,i}$ (i=0, ... 7) enters the pertaining $k_0$ input 27, a time period T, equal to the 8 kHz frequency period, is needed. This will mean that the samples of signals $X_k(z^{64})$ can be sent in a serial manner to input 3 of FIG. 5; processor 4 performs a DFT on 8 consecutive samples block within an $8\tau$ period, and the outputs of processor 4 are serially arranged, then the samples transit through multiplier 6; consequently, multiplexer 30 will allot the samples of signals $p_{k_o,i}$, with a constant value of $k_o$, in a time sequence to the proper input of the filters and modulators block 28.

Filter 17 is inserted at the output of the cited block and the digital modulator 31 follows, at the output of which only the real samples are considered.

Reference has been made in the herein invention to a preferred embodiment, in particular to the case wherein it is wished to frequency multiplex 64 base-band signals. However, the equipment can be implemented for a number N of signals, equal to a power of 2. Said number N is split into the product of numbers p and q, i.e., N=p.q, where p and q are still powers of 2. Should $\Omega$ be the sampling frequency of each base-band signal, then the frequency multiplexed signal will have an N$\Omega$ frequency repetition period equal to its sampling frequency. As a result, p sets of q signals are now formed, the latter having a p$\Omega$ interval upon reaching their definite frequency allocation after multiplexing.

The samples of each set of q signals are transformed via a DFT of dimension "q" and the output complex signals are multiplied by the $$W_N^{k_o,i}$$

factor, where "$k_o$" ranges from 0 to p−1, and "i" from 0 to q−1. The samples are then sent to a filter and modulator network with p inputs, and said network is foreseen to filter and modulate the real and the imaginary components. Before inputting into said network, the real and imaginary signal components exchange their role as per the aforestated procedure and reason. The complex signal undergoes a complex $\Omega/4$ modulation at the output of the filter and modulator block in order to be properly frequency allocated. Various types of simplifications are possible on block 28 of FIG. 5, moreover, the functions carried out by the various blocks can be of different configuration depending on the preference and on the evolution of the digital components used in the equipment implementation. Two main simplifications are stated herein which render the invention particularly advantageous with respect to others. The first simplification arises from the fact that the first filters of the set $K_o(z)$, $K_1(z^2)$ . . . $K_L(z^N)$ appearing in expression (2), are particularly simple, i.e., of low degree; specifically when breaking-down expression (4), filters $H_i(z^8)$ have few terms, and this will mean that the set of $H_i(z^8)$ filters of block 29 in FIG. 5 can be implemented as a single filter with coefficients changing at a rate of 512 kHz. If this new single filter receives, at the beginning of the time T interval, a sequence of eight samples relative to signals $p_{k_o,i}$, with "$k_o$" constant and "i" variable from 0 to 7, it will empty its delay elements content before the incoming of the next set of examples pertaining to the same $k_o$ value.

For example, with 64 signals a possible set of filters is:

$$K_0(z) = (1 + z^{-1})^2 \quad (10)$$
$$K_1(z^2) = (1 + z^{-2})^3$$
$$K_2(z^4) = (1 + z^{-4})^3$$

and the product of the three previous filters supplies a filter $$\sum_{i=0}^{20} h_r z^{-r},$$

where the values of coefficients $h_r$ are as per the following Table II:

TABLE II

| | | |
|---|---|---|
| $h_0 = 1$ | $h_8 = 22$ | $h_{16} = 9$ |
| $h_1 = 2$ | $h_9 = 24$ | $h_{17} = 6$ |
| $h_2 = 4$ | $h_{10} = 24$ | $h_{18} = 4$ |
| $h_3 = 6$ | $h_{11} = 24$ | $h_{19} = 2$ |
| $h_4 = 9$ | $h_{12} = 22$ | $h_{20} = 1$ |
| $h_5 = 12$ | $h_{13} = 20$ | |
| $h_6 = 16$ | $h_{14} = 16$ | |
| $h_7 = 20$ | $h_{15} = 12$ | |

The above table gives on each row, from top to bottom, the coefficients of filters $H_i(z^8)$ with "i" variable from 0 to 7. Data scaling is not set forth in this description since it is normal practice in designing digital filters.

Figure 7:
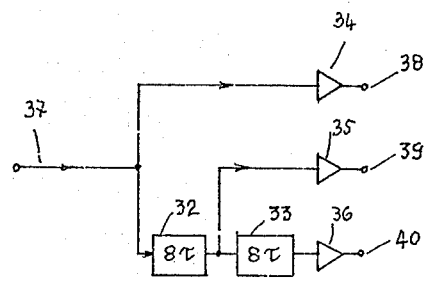
FIG. 7 is a schematic diagram which depicts a non recursive filter used as part of the multiplexing side of the equipment, and in a form suitable to be time shared among different signals.

Each of the filters 29 in FIG. 5 can be implemented according to the diagram of FIG. 7. Let us assume that said filter is the one inserted in input 27 and which, in FIG. 5, has been attributed with value "0" of index $k_o$. Then, it receives at its input 37 a sequence of samples as indicated by FIG. 6(d); every sequence of eight samples is orderly multiplied, via multiplier 34, by the values of the first column at the left of table II and read from top to bottom.

The same samples available at input of multiplier 34 will be available at input of multiplier 35 after an $8\tau$ delay produced by delay element 32 and multiplied by multiplier 35 by the values of the second column of table II.

Figure 8:
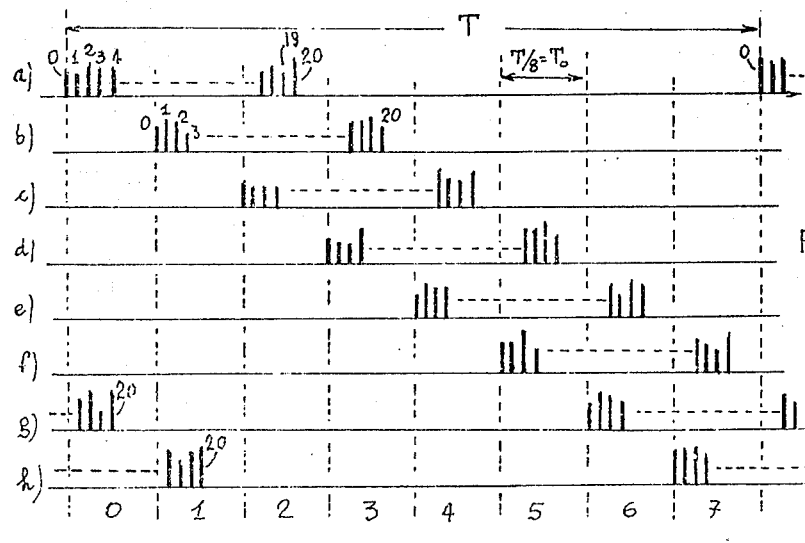
FIGS. 8(a) through 8(h) are timing diagrams which depict the signal samples coming out from outputs of the filter of FIG. 7, when such filter is used on the multiplexing side of the system of FIG. 1.

Similarly said samples shall appear at the input of multiplier 36 with a $16\tau$ delay as compared to input 37, this owing to the presence of delay elements 32 and 33, and multiplied by multiplier 36 with the coefficients of the last column on the right of table II, where the missing coefficients are to be considered zero. The samples outputting from paths 38, 39, 40 shall be joined on one single path, thereby supplying a 21 pulse sequence as shown in FIG. 8, line (a), and forwarded to the next filtering block. All the filtering blocks 29 arranged in a column (FIG. 5) are identical; moreover, they operate in a similar manner on the eight incoming sample blocks and the outgoing sequences are shown on FIG. 8 from lines 'a' to 'h'. Only one filtering block 27 of FIG. 5 instead of eight can now be used, and shall be implemented as per FIG. 7, since all the elements of FIG. 7 are used on each set of eight samples (see FIG. 6d) for a T/8 time only. In fact as the samples of signals $p_{k_o,i}$ flow in a time sequence with T/8 interval among groups of samples marked with different index $k_o$ value, they can all be sent to input 37 as long as outputs 38, 39, 40 are properly connected to inputs $E_i$ of the following eight filtering blocks 41 of FIG. 5. By dividing the time interval T, which occurs between two incoming samples of the same signal $p_{k_o,i}$, into eight $T_o$ intervals numbered as per FIG. 8, this same FIG. 8 also gives the connections to be made between outputs 38, 39, 40 and inputs $E_i$. The connections have already been cited in table I where outputs 38, 39, 40 of FIG. 7 have been represented by letters A, B, C respectively. The filtering so performed corresponds to the cascade connection of the three filters defined by expression (10). This type of filtering causes a loss of less than 0.05 dB at the +2 kHz and −2 kHz pass-band limits and an attenuation greater than 75 dB on the same frequency range located around the 256 kHz frequency (where crosstalk is unintelligible) and greater than 85 dB around the other frequencies which are integer multiples of 64 kHz.

The advantage of the embodiment lies in the fact that the simplifications set forth can be applied to a wide range of N values, number of paths to multiplex. To further elucidate: should N=16 it will be possible, for example, to distribute the sixteen signals into four sets of four signals each, thereby performing a DFT on each of the aforestated sets. Since $L=\log_2 16=4$, filter H(z) shall be factored as follows:

$$H(z) = K_o(z) K_1(z^2) K_2(z^4) K_3(z^8) K_4(z^{16})$$

where variable z is now $\exp(j2\pi w/w_1)$ wherein $w_1$ equal to 128 kHz. In this case it can be convenient to choose, by way of example:

$$K_o(z) = (1 + z^{-1})^3$$
$$K_1(z) = -1 + 9z^{-4} + 16z^{-6} + 9z^{-8} - z^{-12}$$
(11)

and the product of the aforecited filters yields a filter $$\sum_{r=0}^{15} h_r z^{-r},$$

the $h_r$ coefficients of which can be arranged as per table III.

TABLE III

| | | | |
|---|---|---|---|
| $h_0 = -1$ | $h_4 = 9$ | $h_8 = 57$ | $h_{12} = -1$ |
| $h_1 = -3$ | $h_5 = 27$ | $h_9 = 43$ | $h_{13} = -3$ |
| $h_2 = -3$ | $h_6 = 43$ | $h_{10} = 27$ | $h_{14} = -3$ |
| $h_3 = -1$ | $h_7 = 57$ | $h_{11} = 9$ | $h_{15} = -1$ |

The above table III, read line by line from top to bottom, gives on each line the coefficients of filters $H_i(z^4)$ wherein i=0,1,2,3 for a decomposition similar to decomposition (4). The filter whose function is analogous to that of the filter shown in FIG. 7 has three $4\tau_1$ delay elements where $\tau_1$ is equal to the period of the 128 kHz frequency, and four multiplying elements the multiplying coefficients of which cyclically assume the values indicated in table III and read along columns.

The loss at the edge of the pass-band of the two filters' product (11) is now less than 0.04 dB and the attenuation in the 4 kHz frequency ranges centered around the 32, 64, 96 kHz frequency is greater than 78 dB.

A further simplification can be introduced in block 28 of FIG. 5 on the non-recursive set of filters the output signals of which are summed after one of them has passed through a modulator. Configurations similar to those illustrated in FIG. 9(a) are depicted in block 28 of FIG. 5; in FIG. 9(a) filters 44 and 45, which are alike, filter signals $X_a(z^8)$ e $X_b(z^8)$ connected to inputs 48 and 49, and the signal at the output filter 45 encounters multiplier 47 which frequency translates the signal spectrum by a quantity equal to half the frequency repetition period of the attenuation function of filter 45.

The structure of FIG. 9(b) is equivalent to that of FIG. 9(a) and now multiplier 47 has been shifted at the input of the filtering structure 45 which has become filtering structure 46 and which differs from the previous one in that its filtering function has been frequency shifted by half its repetition period; this is shown by changing the sign of argument $z^{8r}$ of the function itself. Filters 44 and 46 of FIG. 9b, assumed to be of the non-recursive type, can now merge into one filtering function implemented according to the first canonical form as per FIG. 10, concerning a linear phase fourth-degree filter. The sum of signals $X_a(z^8)$ and $X_b'(z^8)$ at the input ports of filters 44 and 46 of FIG. 9(b) is sent to the input of the multipliers with even order coefficients 52 and 53, as illustrated in FIG. 10, and the difference is sent to the input of the multipliers with odd order coefficients; in the case of FIG. 10 only multiplier 54.

Figure 9:
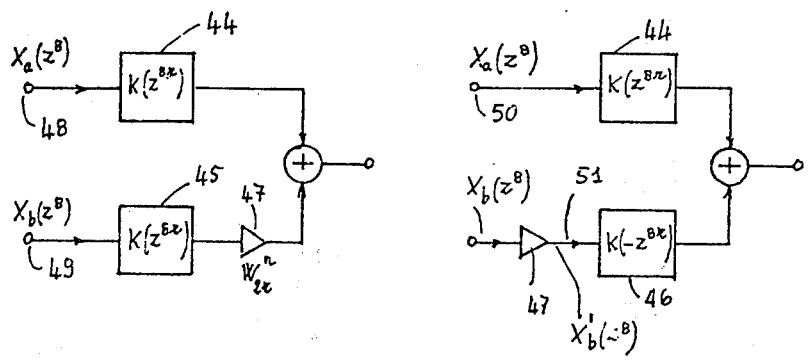
FIG. 9 is a schematic diagram which depicts the shift of a complex modulator from output to input of a filter, in the case where the modulator performs a frequency shift equal to half the frequency repetition period of the filter frequency response.
Figure 10:
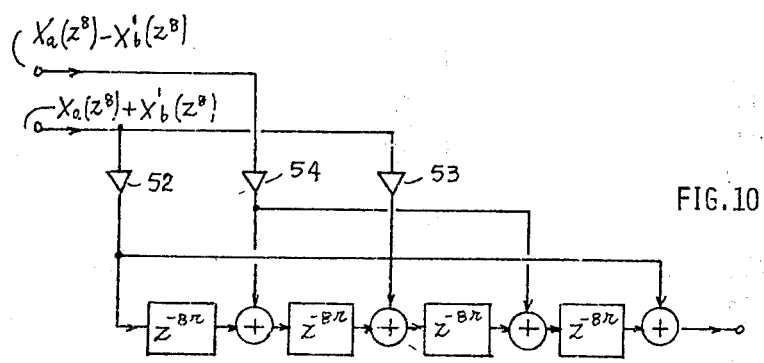
FIG. 10 is a schematic diagram which depicts the merging of the two non recursive filters of FIG. 9 together with the summing node, into a single filter with two inputs and one output.

The transformation illustrated by FIGS. 9 and 10 is applied in block 28 of FIG. 5 to all of the set of filters 41,43 and 25, where output signals are summed after one of them has passed through modulators 42,26 and 24. Specifically, modulators 42, the function of which is to multiply the subsequent samples of the signals transiting in them alternatively by +1 and −1, are also placed at the input of filters $H_i(z^8)$ encountered on route. This produces two effects. The first is that since the function of multiplier 42 is to alternate the sign of the samples inherent to a $\rho_{ko,i}$ signal, with $k_o$ and i being constant and which are $8\tau$ apart, when said multiplier is placed at the input of filter $H_i(z^8)$, the function of which is also that of an interpolator, the signal samples are at a T distance, hence they do not undergo any sign alternation, since said samples are in a time position to which the same sign always pertains. Said modulator 42, is now no longer necessary, therefore it is removed. The second effect is that the passage of modulator 42 at the input of filter $H_i(z^8)$ fitted along its route, will cause said filter to change the argument sign as per FIG. 9; this means that multiplier 35 of FIG. 7 must change the sign of its multiplying coefficients when the samples of signals $\rho_{ko,i}$ marked by the values of index $k_o$ equal to 4,5,6,7 transit through it. FIG. 7 shows the structure assumed by the function of filters 29 of FIG. 5.

What mentioned so far, clarifies the operating mode and the structure of that part of equipment illustrated in FIG. 1 which purpose is to SSB frequency multiplex 64 base-band signals. The normal technical know-how, the implementation of the equipment with a number of signals other than 64, as well as the technology and complexity of digital components available enable to modify the equipment without altering the basic operating principles.

For example, the duplication of the blocks of FIG. 1 from 8 through 17 is needed to filter and modulate the real and imaginary components of the signal and can be avoided when the speed of the digital components used is sufficient. In such a case all a part of the abovecited blocks can process both the real samples and the imaginary ones which are serially arranged with time and are alternated, thereby doubling the operating rate of the blocks. Obviously, the real and imaginary samples in modulators 12 and 22 of FIG. 1 provided with complex multiplying coefficients, are synchronized again so that they can interact, hence they are arranged in an alternate time sequence. Moreover, the equipment used to process N signals, if allowed by equipment operating speed, can multiplex more than one set of N signals where the pertaining time samples will be serially time arranged.

Furthermore, with reference to FIG. 1, some of the filters considered therein as non-recursive can be implemented in a recursive form. For example block 16 of FIG. 1 has a filtering function with a 16 kHz frequency period. In order to have a simpler filter and to compensate for the losses on the pass-bands of the preceeding filters, said filter can be implemented as a recursive one;

in this case the compactness of FIG. 10 is not possible and it will be necessary to use two separate filters for the real part of the signal and likewise for the imaginary part.

The following describes the demultiplexer i.e., that part which receives at its input the signal pertaining to several SSB frequency multiplexed signals, and which provides to split the signal thereby converting it into the base-band signals.

Figure 11:
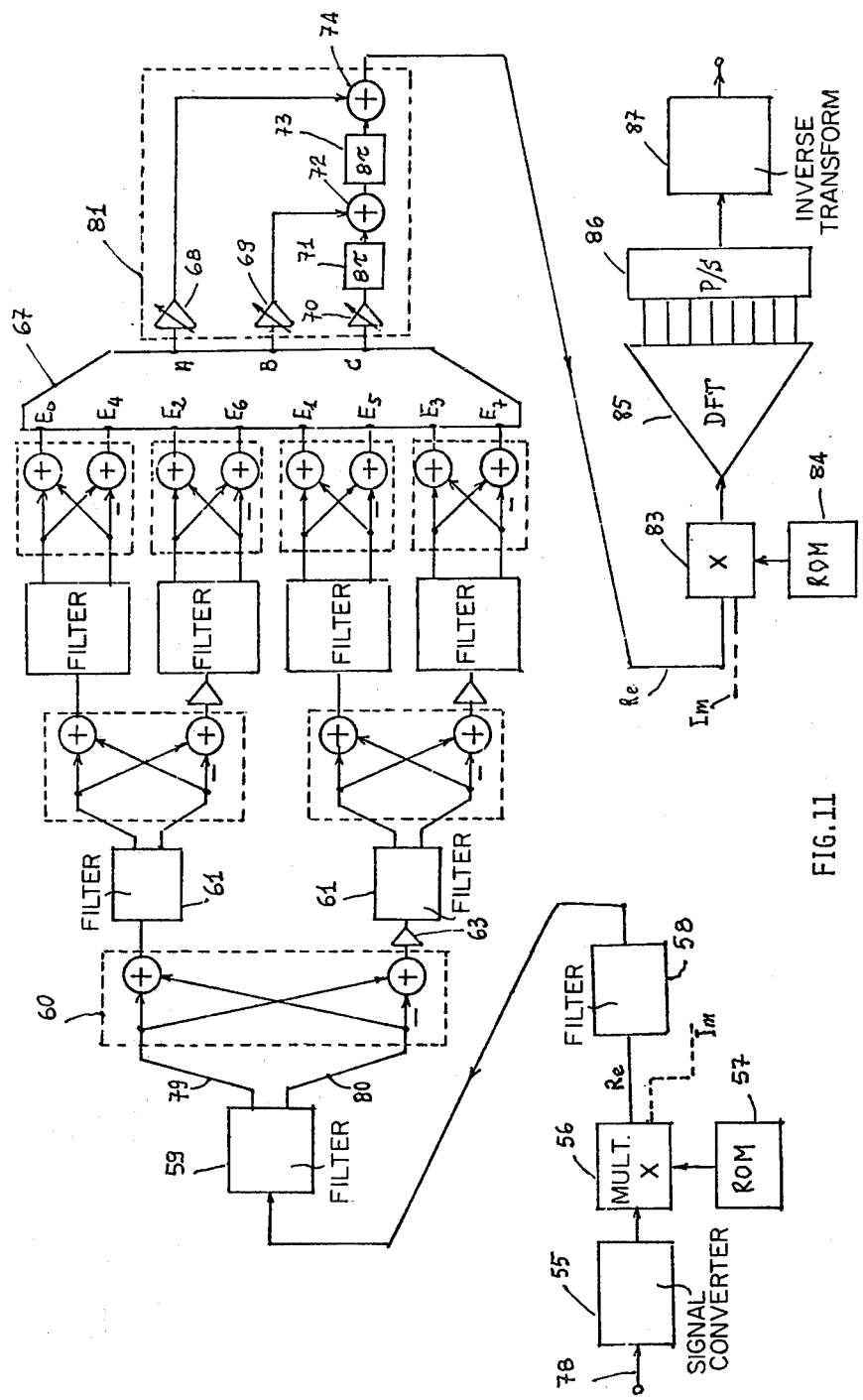
FIG. 11 is a schematic diagram which depicts the receiving side of the equipment, used to demultiplex a signal into its constituent base-band signals.

This part of the equipment is illustrated in FIG. 11.

If still considering the demultiplexing of 64 signals (60 real ones), the multiple signal shall be allocated at input 78 e.g., in the 312–552 kHz frequency band. Block 55 converts said signal into the 8–248 kHz frequency band according to standard norms via the modulating and filtering procedures; said signal is, therefore, sampled at a 512 kHz rate, it is digitally encoded and interpreted as a periodic frequency spectrum signal comprised of 64 4 kHz band signals allocated in the 0 to 256 kHz band, and with the aforecited spectrum symmetrical with respect to odd multiples of the 256 kHz frequency. Said signal, at output of block 55 and at a sample rate of 512 kHz, enters the following multiplier 56 where it is 2 kHz frequency shifted towards the low frequencies via the multiplying of its subsequent real samples with subsequent powers of the complex $\exp(j2\pi/256)$ number; said values are yielded by the ROM 57 memory to multiplier 56. The signals at the output of multiplier 56 are now complex and the subsequent parts of the equipment have to be split-up in order to separately process the real components (Re) parts and the imaginary components parts (Im) at a rate of 512 kHz, except where the aforementioned real and imaginary parts interact. Just as for the transmit section, the route followed by the real signal samples, which goes from block 58 (included) to block 83 (excluded) of FIG. 11, is described, because the imaginary samples are similarly processed. The real part of the signal leaving multiplier 56 is sent to filter 58, the filtering function of which is similar to filter 17 of FIG. 1. The signal leaving filter 58 enters filter 59, where the signal is filtered and subsequently distributed on two outputs. Filter 59 is of the non-recursive type and is implemented according to the second canonical form; should $$\sum_{r=o}^{R} h_r z^{-r}$$

be the expression of its filtering function the signal at output 79 will only pass through even order multipliers, while that at output 80 passes through odd order multipliers. Block 60, which follows, makes a sum and difference between the cited signals, the difference being sent towards multiplier 63. Since the signal samples are at a rate of 512 kHz, the multiplier 63 shall multiply subsequent sets of eight samples each, by the subsequent power of the complex number $$W_8 = (1 + j)/\sqrt{2},$$

each of the cited powers being cyclically repeated at an 8 kHz rate. As already described for the transmission part, assuming the powers of $W_8$ imaginary and complex values, an interaction occurs between the section which processes the real part and that which processes the imaginary part. The signals reaching the two filters 61 are processed in the manner already described for blocks 59, 60 and 63 until arriving at the input of multiplexer 67 where the signal is split on eight different paths. Said multiplexer 67 connects inputs $E_i$ to outputs A,B,C as per modality adopted by multiplexer 9 of FIG. 1. The signals outputting from multiplexer 67 find three multipliers 68,68,70 in the variable coefficients filter which follows; the multiplying coefficients of said multipliers take on the same values of the analogous multipliers of filter 8 shown at FIG. 1, except that said coefficients are now cycled in the reverse order; moreover, the multiplying coefficients of multiplier 69 change sign when the multiplier itself is multiplying samples coming from $E_0$, $E_1$, $E_2$, $E_3$ as compared to when it multiplies samples coming from inputs $E_4$, $E_5$, $E_6$, $E_7$. The samples coming from multiplier 70 are forwarded to the delay element 71 with an $8\tau$ delay wherein they are added in adder 72 with samples coming from multiplier 69. The samples leaving element 72 are forwarded in a second delay element 73 with a delay equal to $8\tau$ and by means of adder 74 are added with samples coming from multiplier 68. The samples outputting from filter 81 are forwarded to multiplier 83 together with the imaginary samples from the analogous filter provided for the imaginary samples. As for the transmission section the subsequent sets of 64 real samples outputting from filter 81 are indicated as $g_{k_o,i}$.

Index "$k_o$" assumes values from 0 to 7 thereby distinguishing the 8 time consecutive samples which transit through the abovecited $E_r$ paths.

Furthermore, note that multipliers 68,69,70 must modify their eight multiplying coefficients in synchronism with the variations of index "i" which in $g_{k_o,i}$ distinguish the eight samples which have consecutively passed through each $E_r$ path. A similar procedure is applied to the 64 consecutive imaginary samples, subdivided into eight equal groups which are synchronous with the pertaining real samples groups. In subsequent blocks of N complex samples, at the input of multiplier 83, the role of real and imaginary parts is alternately changed, changing also the sign of that component which will, after the above change, assume the role of the real part. At this point, multiplier 83 multiplies the complex sample (now called $\beta_{k_o,i}$) by the $W_N^{k_o(8-i)}$ complex number, being the above cited complex coefficient supplied to multiplier 83 by the ROM 84. Processor 85 which follows, performs a DFT of dimension eight on complex signals $$\alpha_{k_o,i} = \beta_{k_o,i} W_N^{k_o(8-i)},$$

which leave multiplier 83, processing them in groups of 8, with the following ordering of $k_o$ index: 0,4,2,6,1,5,3,7. Only the real value is considered at the output of Processor 85 which performs the DFT.

The samples leaving processor 85 are parallel time arranged into groups of eight and at a 64 kHz rate; said samples are newly serially arranged by element 86. This parallel-to-series conversion is necessary if the DFT calculation is performed in such a way that the transformed data simultaneously appear at the output on eight paths. Data outputting from block 86 can be represented by $x_{k_o+8k_1}$, since they are serially arranged with respect to $k_o$ as cited above, and with respect to index $k_1$ according to the correspondence between index "i"

and index $k_1$ determined by the DFT operation. As already described, the $x_{k_0+8k_1}$ real samples are arranged in 64 consecutive blocks, and in said subsequent blocks the samples of same $k_0$ and $k_1$ indices are the 8 kHz rate samples of the single base-band signal to which a frequency position on the multiple signal was due (re. description in the transmission section and FIG. 2d). The abovementioned samples of each single base-band signal, are to be alternately regarded as real and imaginary due to the alternating of real and imaginary parts at the input of multiplier 83. Said samples at 8 kHz rate represent a base-band complex signal with frequency spectrum arranged as per FIG. 2b, eventually shifted by 4 kHz for signals which positions were assigned from 32 to 63 in the multiplexed signals, according to FIG. 2d. Blocks 87 of FIG. 11 performs inverse transforms on the above cited signals with respect to the TX block 2 of FIG. 1 thereby restituting the PCM streams or the base-band analog signals to the output. To better explain the operating mode of the equipment section schematically shown in FIG. 11, concerned with the demultiplexing of the signal into single base-band signals, a theoretical description of the above equipment operating mode is given hereinafter.

Figure 12:
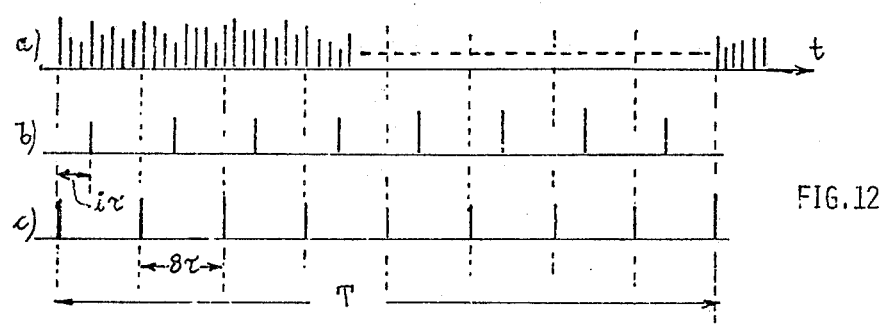
FIG. 12(a), (b), and (c) are timing diagrams which depict a time sequence of the samples of some signals pertaining to the demultiplexing side of the equipment.

The multiplexed complex signal at the output of multiplier 56 of FIG. 11 is denoted by $\hat{Y}(z)$ having said multiplier shifted by 2 kHz the input signal spectrum towards low frequencies, as shown in FIG. 2(e). Said $\hat{Y}(z)$ signal is split into eight $Y_i(z^8)$ signals where "i" varies from 1 to 8; each $Y_i(z^8)$ signal contains different samples of the original signal, at a reciprocal distance of $8\tau$, hence said signals are sampled at a rate of 64 kHz; with respect to a reference sequence of samples of $\hat{Y}(z)$, spaced by $8\tau$ and which constitute the signal $Y_8(z)$, a signal $Y_i(z)$ contains samples which are time shifted by $i\tau$, towards increasing time. FIG. 12(a) schematically represents the complex samples of signal $\hat{Y}(z)$, which samples are time spaced by $\tau$; FIG. 12(b) denotes the samples of a generic $Y_i(z)$ signal with i other than 8; FIG. 12(c) illustrates the samples of signal $Y_8(z)$. The connection among signals $\hat{Y}(z)$ and $Y_i(z^8)$ is given by:

$$\hat{Y}(z) = \sum_{i=1}^{8} z^{-i} Y_i(z^8) \tag{12}$$

The $K\Omega$ frequency shifted version of the filter H(z), called $H_k(z)$, is used to separate a single SSB signal to be translated into its base-band frequency allocation. Since the multiplexed signal $\hat{Y}(z)$ has 512 kHz sample rate, the same sample rate is also present at the output of filter $H_k(z)$ which selects a single signal from the frequency multiplexed signal. Since the single filtered signal has a 4 kHz frequency band, it is sufficient that said signal has an 8 kHz sample sequence instead of 512 kHz, hence the single signal shall have a spectrum which is periodically frequency recurrent with an 8 kHz period as indicated in FIG. 2(b). By using expression (3) for H(z) and by applying the decomposition (4), whereby index "i" is substituted by index "r" so as to distinguish it from index "i" used in expression (2), by splitting index "k", which indicates the single path to extract, into $k_0 + 8 k_1$, and finally by expressing filter $H_k(z)$ with the same modalities used for the transmission path, then a signal $\hat{X}_{k_0+8k_1}$ to be separated, and which is sampled at 512 kHz, can be expressed by:

$$\hat{X}_{k0+8k1}(z) = \sum_{r=0}^{7} z^{-r} W_N^{(k0+8k1)r} H_r(z^8 W_N^{-8k0}) K_3(z^8 W_N^{-8k0}) \cdot \tag{13}$$

$$K_4(z^{16} W_N^{-16k0}) K_5(z^{32} W_N^{-32k0}) K_6(z^{64}) \sum_{i=1}^{8} z^{-i} Y_i(z^8)$$

A first sample decimation of signal $\hat{X}_{k_0+8k_1}(z)$, is made by summing the spectrum of signal itself with its frequency translations along multiples of 64 kHz, thereby arriving at the conclusion that it is sufficient to consider the two summations in (13) with indices "i" and "r" linked by relation:

$$i+r=8$$

i.e., index "r" can be substituted by index 8-i, in expression (13) thus obtaining (disregarding an unessential delay $z^{-8}$):

$$\tilde{X}_{k0+8k1}(z^8) = \sum_{i=1}^{8} W_N^{k0(8-i)} W_N^{-8k1i} Y_i(z^8) H_{8-i}(z^8 W_N^{-8k0}) \cdot \tag{14}$$

$$K_3(z^8 W_N^{-8k0}) K_4(z^{16} W_N^{-16k0}) K_5(z^{32} W_N^{-32k0}) K_6(z^{64})$$

Relationship (14) expresses the fact that each signal $Y_i(z^8)$ is filtered by eight different filters distinguished, besides index "i", by index $k_o$ which assumes the eight values from 0 to 7, thereby obtaining complex $\sigma_{k_0,i}$ signals at the output of the aforestated filters. The filtering function that filters every signal $Y_i(z^8)$ can be implemented in a way similar to the one used for the multiplexing side, therefore obtaining the structure of filters and modulators depicted in FIG. 13, to be meant doubled to process real and imaginary signal components of the $Y_i(z^8)$ signal. The structure of FIG. 13 has to be intended for the moment as pertaining to a specific value of index "i". Said structure operates at a rate of 64 kHz and the identical filters 96 are marked by index 8-i, therefore, filter $H_i(z^8)$ belongs to signal $Y_i(z^8)$, according to the following Table IV, where in each column it is possible to find the correspondence between the value of "i" and the relative value of "r".

TABLE IV

| i | 1 | 2 | 3 | 4 | 5 | 6 | 7 | 8 |
|---|---|---|---|---|---|---|---|---|
| r | 7 | 6 | 5 | 4 | 3 | 2 | 1 | 0 |

Figure 13:
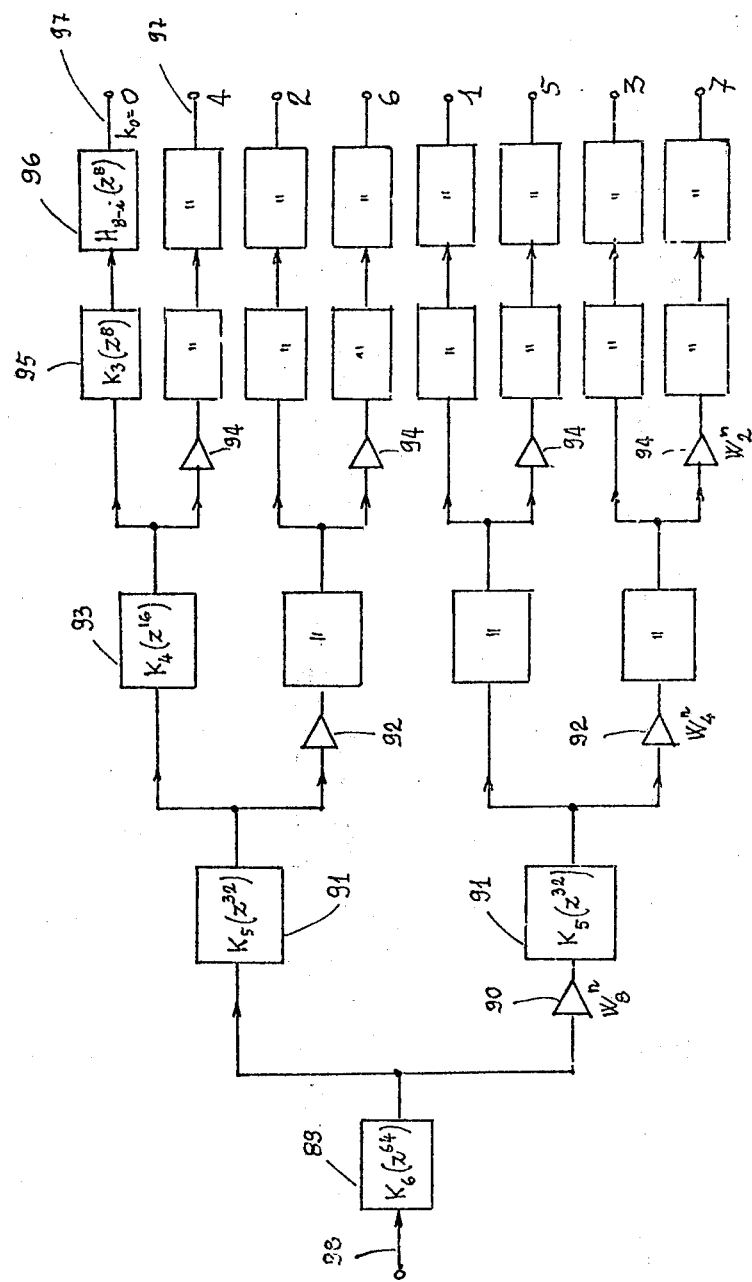
FIG. 13 is a schematic diagram which depicts the filtering and modulating part of demultiplexing side of the equipment in a more straightforwardly derivable form.

In FIG. 13 signal $Y_i(z^8)$ goes into input 98 where it finds filter 89 which performs the $K_6(z^{64})$ filtering function. At the output of said filter the signal is simultaneously sent onto two paths, on one of which said signal encounters modulator 90 which multiplies the subsequent samples by the subsequent powers of the $$W_8 = (1 + j)/\sqrt{2}$$

number, said values having an 8 kHz repetition period. Hence, the signals transit in two identical filters 91, at the output of which the outgoing signals are again simultaneously sent onto two paths. After the signals have passed through modulators 92 and 94 and through filters 93,95,96, the $\sigma_{k_0,i}$ signals will appear at outputs 97. As already stated, signals $Y_i(z^8)$ are complex, therefore the structure of FIG. 13 must be duplicated in order to process in an identical manner the real part and the imaginary part, having in mind the interactions between the two structures for real and imaginary samples at the output of multipliers 90 and 92, there being no interaction for multiplier 94 which assumes +1 and −1 real values.

The structure of FIG. 13 can be simplified along the same criteria used for block 28 of FIG. 5. Specifically, multipliers 90,92,94 are transferred at the output of the filtering structures, i.e. 91,93, and at the output of the cascade connected filters 95 and 96, changing furthermore the argument sign of the function representing the filter contained in the aforementioned blocks. Those pairs of non-recursive filters 91,93 and 95 having the same input signal, can be merged into one filter, of the second canonical form, with two separate outputs, one for the sum of signals coming from even order coefficients, and the other for the sum of signals obtained from odd order coefficients of the aforestated filter. The signals of the aforecited two outputs are combined into sum and difference signals. The structure of FIG. 13 is duplicated for real and imaginary samples and is envisaged to operate on the samples of a signal $Y_i(z^8)$ at a rate of 64 kHz; but it can process signals $Y_i(z^8)$ for all of the values of "i" from 1 to 8, if said signals enter input 98 already time multiplexed i.e., with the same structure of the original $\tilde{Y}(z)$ multiple signal depicted in FIG. 12(c); said structure shall now operate at a rate of 512 kHz. Filters 96 shall now have the multiplying coefficients varying with time at a rate of 512 kHz and cyclically assuming versus time the values belonging to filter $H_r(z^8)$ where r is pertaining to the samples subsequently transiting with a $\tau$ time interval, and distinguished by index "i" which is related to r as per relationship given in table IV. Complex signals $\sigma_{k_0,i}$ going out at a rate of 64 kHz from the real and imaginary block of the structure of FIG. 13 and pertaining to a constant "i" index, can be decimated at a rate of 8 kHz by cyclically extracting, at every T time interval from each output 97, only eight time adjacent samples.

Every sequence of T spaced samples extracted from each output 97 belong to the same value of index i and constitute an 8 kHz rate signal which is denoted by $$\hat{\sigma}_{k_0,i}(z^{64}).$$

Relationship (14) can now be expressed as:

$$X_{k_0+8k_1}(z^{64}) = \sum_{i=1}^{8} W_N^{-8k_1 i} W_N^{k_0(8-i)} \hat{\sigma}_{k_0,i}(z^{64})$$

The whole set of signals $$X_{k_0+8k_1}(z^{64}) \text{ or } \hat{\sigma}_{k_0,i}(z^{64})$$

gives a time sequence of 64 sample blocks.

The samples of every block are denoted by $$x_{k_0+8k_1} \text{ and } \beta_{k_0,i},$$

where indices $k_o$ and $k_1$ assign the samples to the respective time multiplexed signals. Samples $\beta_{k_0,i}$ are multiplied by the $$W_N^{k_0(8-i)} \text{ values, hence becoming } \alpha_{k_0,i}.$$

A subsequent DFT is performed on every set of eight samples having a time distance of $\tau$ and going out from one path 97 of FIG. 13 and to which a fixed value of index $k_o$ belong. The DFT can be expressed as:

$$x_{k_0+8k_1} = \sum_{i=1}^{8} W_N^{-8k_1 i} \alpha_{k_0,i}$$

By disregarding a phase rotation applied to the baseband signal, the aforecited operation can also be expressed as:

$$x_{k_0+8k_1} = \sum_{i=0}^{7} W_N^{-8k_1 i} \alpha_{k_0,i+1} \tag{15}$$

and supplies the samples of the base-band signal at a rate of 8 kHz, distinguished by fixed values of index $k_o$ and $k_1$. Since the DFT operation expressed by relationship (15) generates complex $x_{k_0+8k_1}$ values, the real or imaginary values are alternately considered for every baseband signal, which represent the signal spectrum, according to the frequency allocation shown in FIG. 2(b). A subsequent 2 kHz translation towards the high frequency supplies the desired spectrum of a base-band real signal sampled at 8 kHz. Alternatively, instead of considering the real and imaginary parts of the samples of each path alternately, the real value obtained from the block output performing the DFT can be taken, thereby switching the real and imaginary part as well as the sign, when needed, of the signal supplied to outputs 97 in blocks of 8 adjacent samples. Said operations should be performed once out of two T time intervals. Since the blocks of 8 adjacent samples to be taken from each of the 8 output 97, at every T time interval, can be extracted during T/8 consecutive time intervals the filtering blocks 96 can be merged into one structure. It will assume the configuration illustrated by block 81 of FIG. 11, bearing in mind that the translation of multipliers 94 towards the outputs of the structure depicted by FIG. 13 (where they become useless and are so suppressed) involves the transformation of function $H_r(z^8)$ of blocks 96 into $H_r(-z^8)$. It results therefrom that the odd order coefficients of the aforesaid filter become negative hence multiplier 69 of block 81 of FIG. 11 must assume negative values when it deals with blocks of 8 consecutive samples belonging to paths 97 which in FIG. 11 have been designated as 4,5,6,7.

The exemplifications and the remarks made in connection with the part required to frequency multiplex the incoming base-band signals are, obviously, applicable to the part required to demultiplex the aforementioned signals.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A single sideband system for multiplexing and demultiplexing a given number of baseband signals equal to a power of two, said system having a multiplexing section comprising:

sampling means for sampling the incoming baseband signals at a predetermined sampling frequency to transform the baseband signals into complex sample signals of sample digital form having real and imaginary parts and a frequency spectrum which is symmetrically arranged around zero frequency;

process means for performing a Discrete Fourier Transform on said complex sample signals in groups and in a substantially identical manner for each group to be frequency multiplexed;

wherein each group of signals contains a number of signals equal to a total number of signals to be frequency multiplexed divided by a power of two, there being at least a first and a second of said groups of said signals;

a multiplier for multiplying said complex sample signals by complex numbers to frequency modulate the complex sample signals;

at least first and second synchronously operating demultiplexers for demultiplexing the real and imaginary parts, respectively, of the frequency modulated signals from said multiplier;

first and second substantially identical filter and modulator circuits, each having one output and a number of inputs equal to the number of said groups of said complex signals, each circuit receiving the real and imaginary parts, respectively from said demultiplexer of the demultiplexed signals of respective signal groups in a serial manner and cyclically in time, the filter portions of said circuit comprising a set of individual filters with a passband equal to the frequency which characterizes each baseband signal, said individual filter being cascade-connected to supply one filtering function with a passband symmetrically arranged around the zero frquency and around frequencies which are integral multiples of the predetermined sampling frequency, and wherein said circuits each include individual modulators for frequency shifting the frequency spectra of signals passing through said circuit by a power of two of a basic frequency which is equal to the predetermined sampling frequency multiplied by the number of signals contained in each groups of signals, said individual filters and modulators being connected in a tree-like structure, wherein the output signals of one-half of the individual filters is summed with the output signal of an identical filter from the other half of the individual filters after the output signals from said other half of said filters is passed through one of said individual modulators; and modulator means for frequency translating the output signal from one output of said filter and modulator circuits by one quarter of the predetermined sampling frequency to provide a sampled multiplexed signal in the form of complex output signal samples having real portions which represent single sideband frequency multiplexing of the system input baseband signals.

2. The system according to claim 1, further comprising a demultiplexing section including:

a modulator for translating the frequency spectrum of the sampled multiplexed signal by half of the frequency band of each signal to be frequency multiplexed, thereby yielding a complex signal made up of real and imaginary samples;

third and fourth identical filters and modulator circuits having one input and a number of outputs equal to an integral power of two and at most equal to half of the signals to be frequency demultiplexed, said circuits including a set of individual filters the passband of which equals the frequency band which characterizes every signal to be baseband demultiplexed, said individual filters being cascade-connected to provide a filtering function with a passband symmetrically arranged about the frequency of zero and multiple of the predetermined sampling frequency, said passband having a range equal to the frequency range which characterizes each of the single signals to be demultiplexed, said circuits further including individual modulators for frequency translating signals passing through the circuit by a power of two of a further basic frequency which is the predetermined sampling frequency divided by the number of outputs of each of said circuits, said filters and modulators being arranged in a tree-like structure wherein signals passed through a single filter is applied to two additional filters, one of which has a modulator at its output to provide two new output signals, and wherein every one of these two new output signals is applied to a following couple of filters, one of these again provided with an output modulator, and so on until the needed number of output signals is obtained;

a set of synchronous multiplexers for extracting, in a cyclic manner and sequentially from each of the outputs of said filters and modulators, a number of time-adjacent samples equal to the number of signals to be demultiplexed divided by the number of outputs of each of said circuits, said samples being sets of real and imaginary samples;

a multiplier for multiplying by proper complex numbers the real and imaginary samples provided by said multiplexers to thereby frequency modulate these samples; and further processor means for performing a Discrete Fourier Transform on said complex samples leaving said multiplier and which operates in an identical manner on the complex samples corresponding to a single output of said third and fourth filter and modulator circuits, the samples provided by said processor means comprising single sideband, bas band samples.

3. A system according to claim 2, further characterized in that only said first filter and modulator circuit, for processing the real and imaginary samples of the signals, is used to process both the time sequentially arranged real and imaginary samples;

said system further comprising means for time-aligning said real and imaginary samples wherein interaction exists between said real and imaginary samples and for setting these samples in a time sequence after said interaction.

4. A system according to claim 2, wherein more than one set of baseband signals are multiplexed and demultiplexed, wherein each set contains an equal number of signals to be multiplexed and demultiplexed, and wherein multiplexed signals are allocated in similar frequency bands that have the same sampling frequency.

5. A system according to claim 4, wherein the individual filters in the multiplexing section, which receive input samples different from zero only for a small portion of the time interval between subsequent samples of the baseband signals comprise a single variable coefficient filtering element having a single input and plural outputs, said single input receiving the real or imaginary components of the complex samples coming from the multiplier, and wherein the multiplexer is connected between said variable coefficient filter and inputs to the remaining part of the first and second filter modulator circuits.

6. A system according to claim 5, wherein, in filters and modulators in the demultiplexing section, those filters inserted near the outputs and providing samples to the following block only for a fraction of a baseband signals sampling, comprise a single variable coefficient filter having several inputs and a single output, said several inputs being connected to the preceding set of filters and modulators through a time variable connection, the samples at the single output being directly applied to said multiplier which is inserted before the Discrete Fourier Transforms processor means.

* * * * *